US005686182A

United States Patent [19]

Maniar

[11] Patent Number: 5,686,182

[45] Date of Patent: Nov. 11, 1997

[54] CONDUCTIVE CARRIER COMPOSITIONS AND PROCESSES FOR MAKING AND USING

[75] Inventor: Deepak R. Maniar, Penfield, N.Y.

[73] Assignee: Xerox Corporation, Stamford, Conn.

[21] Appl. No.: 535,852

[22] Filed: Sep. 28, 1995

[51] Int. Cl.[6] .......... B32B 5/16

[52] U.S. Cl. .......... 428/404; 428/406; 428/407; 427/335; 430/108

[58] Field of Search .......... 428/403, 404, 428/406, 407; 427/335; 430/108

[56] References Cited

U.S. PATENT DOCUMENTS

| | | | |
|---|---|---|---|
| 4,315,902 | 2/1982 | Dilbert | 423/456 |
| 4,420,534 | 12/1983 | Matsui et al. | 428/372 |
| 4,435,375 | 3/1984 | Tamura et al. | 423/439 |
| 4,704,231 | 11/1987 | Chung | 252/511 |
| 4,789,509 | 12/1988 | Ikeda et al. | 264/29.2 |
| 4,794,065 | 12/1988 | Hedvall et al. | 430/111 |
| 4,816,289 | 3/1989 | Komatsu et al. | 423/447 |
| 4,915,925 | 4/1990 | Chung | 423/447.1 |
| 4,937,166 | 6/1990 | Creatura et al. | 430/108 |
| 4,971,880 | 11/1990 | Hotomi et al. | 430/108 |
| 5,149,584 | 9/1992 | Baker et al. | 428/297 |
| 5,271,833 | 12/1993 | Funkenbusch et al. | 210/198.2 |
| 5,354,607 | 10/1994 | Swift et al. | 428/294 |

*Primary Examiner*—H. Thi Le
*Attorney, Agent, or Firm*—John L. Haack

[57] ABSTRACT

A carrier comprised of a core with a coating thereover comprised of at least one polymer resin and at least one fibrillated or non-fibrillated fibrous carbon additive, and wherein the outer surface of the coated carrier is fibrillated.

20 Claims, No Drawings

CONDUCTIVE CARRIER COMPOSITIONS AND PROCESSES FOR MAKING AND USING

CROSS REFERENCE TO COPENDING APPLICATIONS AND RELATED PATENTS

Reference is made to commonly assigned copending applications: U.S. Ser. No. 08/535,602 (D/92558) filed Sep. 28, 1995 concurrently herewith, to named inventor Joseph Mammino, entitled "Fibrillated Carrier Compositions and Processes for Making and Using".

Attention is directed to commonly owned and assigned U.S. Pat. Nos.: 4,937,166, issued Jun. 26, 1990, entitled "Polymer Coated Carrier Particles for Electrophotographic Developers", which discloses a carrier composition comprised of a core with a coating thereover comprised of a mixture of first and second polymers that are not in close proximity thereto in the triboelectric series; 5,220,481, issued Jun. 15, 1993, to Swift et al., entitled "Composite to Enable Contact Electrostatic Voltage Sensing", which discloses a method of preparing fibrillated composite fibers for use electrostatic voltage sensing applications; U.S. Pat. No. 5,424,160, issued Jun. 13, 1995, to Smith et al., entitled "Conductive Carrier Coatings and Processes for the Preparation Thereof", which discloses a coated carrier wherein the coating is comprised of a conductive polymeric dopant in a fluoropolymer host resin; and U.S. Pat. No. 2,965,573, issued Dec. 20, 1960, to Gundlach, which discloses a xerographic developer comprising a physical admixture of carrier particles, toner particles, and relatively large filamentary particles.

The disclosures of each of the aforementioned documents are totally incorporated herein by reference.

BACKGROUND OF THE INVENTION

This invention is generally directed to developer compositions, and more specifically, the present invention relates to carrier compositions comprised of a core with a polymer resin coating thereover containing at least one fibrillated carbon additive, and wherein the outer surface of the carrier coating is fibrillated, and processes for the preparation thereof. The highly fibrillated outer surface structure of the resin coated carrier particles are prepared, in embodiments, for example, by incorporating suitably fibrillated carbon additives into the polymer resin coating mixture or by impregnating the carbon fibers into the surface of the coated carrier particles. The coated carriers are obtained by, for example, dry powder or solution coating processes.

In embodiments of the present invention, the carrier particles are comprised of a core with coating thereover generated from one or more polymers that are not in close proximity in the triboelectric series. Moreover, in another aspect of the present invention, the carrier particles are prepared with one or more polymers applied to the carrier core particle surface enabling insulating particles with relatively constant conductivity parameters; and wherein the triboelectric charge on the carrier can be selected depending on the coatings chosen. Developer compositions comprised of the surface fibrillated, resin coated, carrier particles of the present invention are useful in electrostatographic or electrophotographic imaging systems, especially xerographic imaging processes. Additionally, developer compositions comprised of substantially insulating carrier particles prepared in accordance with the processes of the present invention are useful in imaging methods wherein relatively constant conductivity parameters are desired. Furthermore, in the aforementioned imaging processes, the triboelectric charge on the carrier particles can be preselected depending on the polymer composition, and the amount thereof, applied to the carrier core.

The electrostatographic process, and particularly the xerographic process, is well known. This process involves the formation of an electrostatic latent image on a photoreceptor, followed by development, and subsequent transfer of the image to a suitable substrate. Numerous different types of xerographic imaging processes are known wherein, for example, insulative developer particles or conductive toner compositions are selected depending on the development systems used. Moreover, of importance with respect to the aforementioned developer compositions is the appropriate triboelectric charging values associated therewith, as it is these values that enable continued constant developed images of high quality and excellent resolution.

Additionally, carrier particles for use in the development of electrostatic latent images are described in many patents including, for example U.S. Pat. No. 3,590,000. These carrier particles may consist of various cores, including steel, with a coating thereover of fluoropolymers; and terpolymers of styrene, methacrylate, and silane compounds. Recent effort in the field has focused on the attainment of coatings for carrier particles, for the purpose of improving development quality; and to permit particles that can be recycled, and that do not adversely effect the imaging member in any substantial manner. Another problem encountered with some known carrier coatings resides in fluctuating triboelectric charging characteristics, particularly with changes in relative humidity. The aforementioned modification in triboelectric charging characteristics provides developed images of lower quality, and with background deposits.

There is also illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there is disclosed in the '387 patent coated carrier particles obtained by mixing carrier core particles of an average diameter of from between about 30 microns to about 1,000 microns, with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 650° F. for a period of 20 minutes to about 120 minutes, enabling the thermoplastic resin particles to melt and fuse on the carrier core. While the developer and carrier particles prepared in accordance with the process of the '387 patent, are suitable for their intended purposes, the conductivity values of the resulting particles are not constant in all instances, for example, when a change in carrier coating weight is accomplished to achieve a modification of the triboelectric charging characteristics; and further with regard to the '387 patent, in many situations carrier and developer mixtures with only specific triboelectric charging values can be generated when certain conductivity values or characteristics are contemplated. With the invention of the present application, the conductivity of the resulting carrier particles are substantially constant, and moreover the triboelectric values can be selected to vary significantly as desired, for example, from less than −15 microcoulombs per gram to greater than −70 microcoulombs per gram, depending on the polymer mixture selected for affecting the coating process and the extent to which the resin coated surfaces of the carrier particles are fibrillated.

With further reference to the prior art, carriers obtained by applying insulating resinous coatings to porous metallic carrier cores using solution coating techniques are well known.

Other patents of interest include U.S. Pat. No. 3,939,086, which teaches steel carrier beads with polyethylene coatings, see column 6; U.S. Pat. No. 4,264,697, which discloses dry coating and fusing processes; and U.S. Pat. No. 3,533,835; 3,658,500; 3,798,167; 3,918,968; 3,922,382; 4,238,558; 4,310,611; 4,397,935; 4,434,220 and 4,937,166.

The fibrillated coated carriers and surface coating modification processes of the present invention overcome several disadvantages as illustrated herein, and further enable developer mixtures that are capable of generating high and useful triboelectric charging values with finely divided toner particles; and providing carrier particles that possess substantially constant conductivity. Further, when resin coated carrier particles are surface modified by the processes of the present invention, there are provided developer compositions which possess the following properties: reduced toner dusting during latent image development using fine particle toners, for example, toners with volume average diameters of less than about 7–8 microns; enhanced developer lifetimes or longevity due to an increased tribocharging surface area of the carrier particles; reduced impaction of toner particles on the carrier particles; and increased toner holding capacity of the developer enabling high toner concentration gradient tolerant developers.

Additionally, there can be independently achieved, using the preparative and imaging processes of the present invention, desirable triboelectric charging characteristics and conductivity values. For example the triboelectric charging parameter is not dependent on the carrier coating weight as is believed to be the situation with the process disclosed in U.S. Pat. No. 4,233,387 wherein an increase in coating weight on the carrier particles may function to also permit an increase in the triboelectric charging characteristics. Specifically, therefore, with the carrier compositions and process of the present invention there can be formulated developers with selected triboelectric charging characteristics and/or conductivity values using a number of different formulation combinations.

Thus, for example, there can be formulated in accordance with the invention of the present invention developers with conductivities of from about $10^{6}$ mho $(cm)^{-1}$ to $10^{-17}$ mho $(cm)^{-1}$ as determined in a magnetic brush conducting cell; and triboelectric charging values of from about −5 to a −80 microcoulombs per gram on the fibrillated coated carrier particles as determined by the known Faraday cage technique. Thus, the developers of the present invention can be formulated with constant conductivity values with different triboelectric charging characteristics by, for example, maintaining the same coating weight on the carrier particles and changing the ratio of polymer resins used to form the coating. Similarly, there can be formulated developer compositions wherein constant triboelectric charging values are achieved and the conductivities are altered by retaining the polymer coating ratio constant and changing the relative polymer coating weight for the carrier particles.

The following United States patents are noted:

U.S. Pat. No. 4,971,880, issued Nov. 20, 1990, to Hotomi et al., discloses a developer such as a toner and/or carrier for use in electrophotographic developing processes, and more specifically relates to a developer containing halogenated amorphous carbon particles prepared by plasma-polymerization, wherein the particles may take two forms, i.e., one with seed particles which is coated with the plasma-polymerized film containing at least carbon and halogen or the other without the seed particles which is formed by plasma-reacting carbon and halogen.

In U.S. Pat. No. 5,354,488 there is disclosed a publication entitled "Quest", dated Summer 1986, pages 53–63, in an article entitled "Exploring the TRW Carbons", by Jack Blumenthal et. al., which itself discloses a particulate suspension for a fluidic device comprising iron powder (75% by weight), mineral oil, and 1% TRW carbon. TRW is a filamentary carbon in which the carbon fibers have a diameter of about 0.05 to 0.5 microns and a length up to several thousand times the diameter. The particles are made in a catalytic carbon disproportionation reaction in which a low heating value fuel gas or or other source of carbon is used as the reaction feed.

U.S. Pat. No. 5,271,833, issued Dec. 21, 1993 to Funkenbusch et al., discloses polymer-coated carbon-clad inorganic oxide particles which are useful in sorbent applications, particularly as packing materials for High Performance Liquid Chromatography (HPLC).

U.S. Pat. No. 5,149,584, issued Sep. 22, 1992, to Baker et al., discloses a carbon fiber structure suitable for use in high performance composites which structure is characterized by primary carbon fiber structure having carbon filaments grown therefrom, wherein substantially all of the filaments are in the form selected from branched, spiral, helical, or a combination thereof.

U.S. Pat. No. 4,915,925, issued Apr. 10, 1990, to Chung, discloses the preparation of exfoliated graphite fibers with reduced density, increased diameter, and flexibility.

U.S. Pat. No. 4,704,231, issued Nov. 3, 1987, to Chung discloses composites comprising exfoliated graphite flakes in a polymer matrix which constitutes a small volume fraction; the density of the composite is 0.7 $g/cm^{3}$ or below and the electrical resistivity of the composite is 0.5 ohm.cm or below.

U.S. Pat. No. 40794,065, issued Dec. 27, 1988 to Hedvall et al., discloses a toner particle having multiple protuberances comprised of latex particles on its exterior surface and methods for the preparation thereof.

U.S. Pat. No. 4,816,289, issued Mar. 28, 1989, to Komatsu et al., discloses a carbon filament comprising carbon layers and having a carbon structure in which the carbon layers are arranged substantially in the form of growth rings as viewed in cross-section, said carbon structure having an $I_{1580}/I_{1360}$ ratio in Raman scattering spectrum of 1 or more and being readily convertible upon heating to a graphite structure.

U.S. Pat. No. 4,435,375, issued Mar. 6, 1984, to Tamura et al., discloses a novel type of carbon filaments grow from a purified graphite material when the purified graphite material is heated in a plasma.

U.S. Pat. No. 4,315,902, issued Feb. 16, 1982, to Dilbert discloses carbon black produced in a process comprising prequenching with hollow cone prequench having an included angle effective to produce high tint residual carbon black.

U.S. Pat. No. 4,420,534, issued Dec. 13, 1983, to Matsui et al., discloses conductive composite filaments that are formed by conjugate-spinning a conductive component composed of a thermoplastic polymer and/or a solvent soluble polymer and conductive metal oxide particles and a non-conductive component composed of a fiber-forming polymer.

The disclosures of each of the aforementioned documents are totally incorporated herein by reference.

There exists a need for highly robust developer compositions for use in high speed—high print per minute imaging operations and under drastically changing environmental conditions, for example, temperature and humidity.

There also remains a need for coated carrier compositions with highly fibrillated outer surfaces and which carriers are capable of providing developers with desirable development and imaging characteristic.

Still further, there is a need for processes for the preparation of coated carrier compositions wherein the outer surface of the polymer resin coating is highly fibrous or fibrillated and possesses desirable properties as illustrated herein.

Solutions to the above problems and needs have been unexpectedly found in the fibrillated carrier compositions and processes of making and using of the present invention. The carrier compositions provide superior developer compositions that enable improved developer and carrier longevity, and controlled conductivity and triboelectric charge levels compared to those known in the art.

SUMMARY OF THE INVENTION

It is an object of the present invention to provide toner and developer compositions with carrier particles containing a polymer or polymer mixture coating wherein the outer surface of the carrier coating is fibrillated.

In another object of the present invention there are provided surface coating treatment processes for generating fibrillated carrier particles and which particles have selectable and substantially constant conductivity parameters.

In yet another object of the present invention there are provided processes for preparing surface fibrillated coated carrier particles with substantially constant conductivity parameters, and a wide range of preselected triboelectric charging values.

In yet a further object of the present invention there are provided surface fibrillated coated carrier particles comprised of a core, and a coating with a mixture of polymers that are not in close proximity, that is for example, a mixture of polymers from different positions in the triboelectric series, and at least one fibrillated or non-fibrillated carbon additive which renders the outer surface of the coated carrier to be highly fibrous or fibrillated.

In still yet another object of the present invention there are provided surface fibrillated coated carrier particles comprised of a core, a thermoplastic resin surface coating, and fibrous particulate material embedded in and protruding for the resin surface coating.

Other objects of the present invention include providing: a method and means for controlling toner dusting in xerographic development processes employing small sized toner particles; a method of suppressing xerographic machine dirt and uncontrolled toner powder clouding, especially with small sized color toner particles; increased tribo charging sites on the carrier surface; improved developer charge control properties; and improved developer lifetime or longevity.

These and other objects are achieved, in embodiments, of the present invention as described and illustrated herein.

DETAILED DESCRIPTION OF THE INVENTION

Resin coated carrier compositions can be prepared in embodiments of the present invention which have a highly fibrous or fibrillated outer surface texture and structure. The fibrillated coated carriers have numerous advantages and improvements over comparatively smooth surface coated carrier compositions known in the art and as illustrated herein.

In embodiments of the present invention, there are provided carrier composition comprised of a core with a coating thereover comprised of at least one polymer resin, such as one to about five resins, and preferably one to two resins, and a fibrous carbon particulate additive, and wherein the resulting outer surface of the polymer resin coated carrier is fibrillated.

In embodiments of the present invention, there are provided developer compositions comprised toner particles, and carrier particles comprised of a core with a coating thereover comprised of at least one polymer resin and a fibrous carbon particulate additive, and wherein the outer surface of the polymer resin coating is fibrillated.

In embodiments of the present invention, there are provided fibrillated coated carrier particle compositions and which coated particles have a considerably higher total surface area compared to uncoated or coated carrier particles which do not incorporate a fibrous carbon additive on the surface of the carrier particle.

In embodiments of the present invention, there are provided highly conductive fibrillated coated carrier compositions wherein the polymer resin coating contains other performance additives, for example, charge control additives, plasticizer compounds, non-conductive fibrous particulate materials, and mixtures thereof.

In embodiments of the present invention, there are provided processes for preparing fibrillated coated carrier compositions comprising: coating carrier core particles with a mixture of at least one solvent soluble polymer resin, fibrillated carbon fibers, an optional plasticizer compound, and a solvent or solvent mixture; and evaporating the solvent, and wherein the resulting outer surface of the coated carrier is fibrillated. In other embodiments, the fibrillated coated carriers can be prepared by the inclusion of fibrous carbon particulate materials in the polymer resin or resins used in, for example, dry powder or solution coating processes. In still other embodiments, the fibrillated coated carriers can be prepared by the inclusion of a plasticizer compound along with a resin, and a fibrous conductive carbon additive, in the solvent coating mixture.

In embodiments of the present invention, there are provided processes for preparing fibrillated coated carrier compositions comprising coating carrier core particles with a mixture of at least one polymer resin, a fibrillated or non-fribrillated carbon fiber particulate additive, and optionally a plasticizer compound, and wherein the resulting outer surface of the coated carrier is fibrillated. Thus, fibrillated coated carrier compositions of the present invention can be, in embodiments, obtained when an appropriate fibrous carbon particulate additive is selected, for example, reference the aforementioned U.S. Patents, particularly U.S. Pat. Nos. 4,704,231 and 4,915,925. The fibrillated coated carrier particles may optionally be subsequently agitated with high shear by, for example, roll milling or attriting, to further fibrillate the coated surface and or to further modify the tribocharge or conductivity properties of the carrier particles.

The term "fiber", for example, refers to any carbonaceous particles which exhibit geometries, appearance, and physical characteristics which provide fibrils, tendrils, tentacles, threadlets, ligaments, hairs, bristles, or the like structures.

The term "fibril", for example, refers to a small, slender fibrous carbon containing particle, with an average diameter of about 0.001 microns to about 0.5 microns, and an average length of about 0.1 micron to about 1,000 microns.

The term "fibrillation" refers to, for example, the forming of fibers.

The term "fibrillated" refers, for example, to a surface having a fiber or fibers thereon. Thus, a surface such as a coated carrier particle of the present invention having a coating thereover containing a fibrous carbon additive as illustrated herein, produces a fibrillated or fibrous carrier surface.

In other embodiments, of the present invention, there can be included in the thermoplastic resin overcoating a fibrillated carbon fiber material, that is, a fibrous carbon particulate material having still other fibers, typically smaller fibers or subfibers, extending from the surface of individual fibers.

Fibrillated and non-fibrillated fibers and resin materials are known in the art, reference for example, U.S. Pat. No. 5,405,923 which discloses suspension polymerization processes for preparing non-fibrillatable polytetrafluoroethylene particles which are irregular, fibrous, and coarse; U.S. Pat. No. 4,883,716 which discloses the known tendency of dispersion derived polytetrafluoroethylene to fibrillate upon intimate particle contact; U.S. Pat. No. 4,729,921 and U.S. Pat. No. 4,698,267 which disclose characterization and control of fibrillation in aramid fibers; and U.S. Pat. No. 4,410,586 which discloses reinforcing polymer matrices with fibers, to form films and fibrillated films, the disclosures of which patents are incorporated herein by reference in there entirety.

Although not wanting to be limited by theory it is believed that the aforementioned fibrils on the surface of the carrier particles of the present invention impart unexpected and unique properties to the carrier particles and to developers formulated therefrom. Thus, the fibrilled carrier compositions of the present invention are further differentiated from known compositions in that compositions of the present invention provide relatively constant conductivity and stable triboelectric values with unexpectedly long life, for example, in excess of about 500,000 impressions.

The fibrillated outer surface of the polymer coating has a relatively larger surface area which is from about 0.1 to about 500 percent greater than the corresponding unfibrillated carrier coating surface area, and a relatively large fiber surface area coverage, for example in embodiments, of about 10 fiber per 100 square microns to about 90,000 fibers per 100 square microns.

Carbon fibrils can be introduced to the surface of the resin coated carrier particles by incorporating the fibrils into the resin surface coating mixture or adding to the coated carrier surface fibrous carbon particulate materials. Fibrous carbon particulate materials of the present invention includes, but are not limited to, fibrils, fibers, flakes, whiskers, and mixtures thereof. The fibrous carbon particulate material additive is present in amounts of from about 0.5 to about 50 weight percent based on the total weight of the polymer resin coating.

Polymeric coatings selected for use in the present invention provide sufficient: coating and adhesion properties to the core particle surface; and triboelectric charging and conductivity characteristics, so as to achieve the aforementioned objectives.

In embodiments of the present invention, the process of forming fibrillated coated carriers can be improved and made more efficient by the addition of at least one plasticizer compound to the polymer resin coating mixture. Although not wanting to be limited by theory it is believed that the addition of the plasticizer compound to the polymer resin coating mixture alters the rheology of the resin coating so that the desired surface carbon fibrils are formed more readily during the coating process. Examples of suitable plasticizer compounds include phthalic anhydrides, substituted phthalic anhydride compounds, such as tetrachlorophthalic anhydride polyvinyl chloride, cellulose ester compounds, adipate and sebaccate esters, polyol compounds, tricresyl phosphate, and mixtures thereof, as well as other known plasticizer compounds.

The carrier core particles preferrably have a density greater than the density of the toner resin particles selected for formulating a developer and include, but are not limited to, iron, ferrites, steel, nickel, magnetites, glass, ceramic composites, plastic and mixtures thereof.

The resin coating on the surface of the carrier particles is from about 0.05 to about 3 weight percent. The carrier core has an average particle diameter of from about 25 microns to about 1,000 microns.

The amount of the aforementioned performance additives that can be added and used in the resin coating on the surface of the carrier particles is from about 0.05 to about 30 weight percent relative to the weight of the resin coating used.

In embodiments, the polymer resin coating can be a single resin or a mixture of two or more resin, and preferably comprised of a first polymer in an amount of from about 40 to about 60 percent by weight, and a second polymer in an amount of from about 60 to about 40 percent by weight.

In a preferred embodiment, the resin coating weight is 0.1 percent, the triboelectric charge on the carrier particles is about −63 microcoulombs per gram, the conductivity of the carrier particles is about $10^{-15}$ mho-cm-$^{-1}$, and the carrier coating is a mixture of resins polymethyl methacrylate and polyvinylidene difluoride and a fibrillated carbon additive as illustrated herein.

These and other objects of the present invention are provided by developer comprised of toner particles, and carrier particles prepared by a solution or powder coating process; and wherein the carrier particles comprise a core with a coating thereover comprised of at least one polymer resin and a fibrillated carbon additive and wherein the outer surface of the carrier coating is fibrillated. More specifically, the carrier particles selected can be prepared by mixing low density porous magnetic, or magnetically attractable metal core carrier particles with from, for example, between about 0.05 percent and about 3 percent by weight, based on the weight of the coated carrier particles, of a polymer or polymers until adherence thereof to the carrier core by mechanical impaction or electrostatic attraction; heating the mixture of carrier core particles and polymers to a temperature, for example, of between from about 200° F. to about 550° F., for a period of from about 10 minutes to about 60 minutes enabling the polymers to melt and fuse to the carrier core particles; adding the fibrous carbon particulate material to the surface of the resin coated core particles, preferrably while the resin is still in a molten or melt state; cooling the coated carrier particles; and thereafter classifying the obtained carrier particles to a desired particle size. The addition of the fibrous carbon particulate material can be accomplished by any known means, for example, aerosol spray, roll milling, spray drying, fluidized bed coating, sputtering, jetting, attriting, and the like.

In a specific embodiment of the present invention there are provided carrier particles comprised of a carrier composition comprised of a core with a coating thereover comprised of a mixture of first and second polymers that are not in close proximity thereto in the triboelectric series. Therefore, the aforementioned carrier compositions can be comprised of known core materials including iron with a polymer coating mixture thereover. The fibrillated or non-fibrillated fibrous carbon particulate additive may be included in the polymer resin at the time the carrier core is coated with the resin, or alternatively the particulate additive can be added to the surface of the carrier subsequent to the resin coating step. Subsequently, developer compositions of the present invention can be generated by admixing the aforementioned carrier particles with a toner composition comprised of resin particles and pigment particles.

Various suitable solid core carrier materials can be selected providing the objectives of the present invention are obtained. Characteristic core properties of importance include those that will enable the toner particles to acquire a positive charge or a negative charge; and carrier cores that will permit positive or negative triboelectric charging values, for example, from about 5 to about 80 microcoulombs per gram, and desirable flow properties in the developer reservoir present in a xerographic imaging apparatus. Also of value with regard to the carrier core properties are, for example, suitable magnetic characteristics that will permit magnetic brush formation in magnetic brush development processes; and also wherein the carrier cores possess desirable mechanical aging characteristics.

Illustrative examples of mixed resin polymer coatings selected for the carrier particles of the present invention include those that are not in close proximity in the triboelectric series. Specific examples of polymer mixtures used are polyvinylidenefluoride with polyethylene; polymethylmethacrylate and copolyethylenevinylacetate; copolyvinylidenefluoride, tetrafluoroethylene and polyethylene; polymethylmethacrylate and copolyethylene vinylacetate; and polymethylmethacrylate and polyvinylidenefluoride. Other related polymer mixtures not specifically mentioned herein can be selected providing the objectives of the present invention are achieved, including for example polystyrene and tetrafluoroethylene; polyethylene and tetrafluoroethylene; polyethylene and polyvinyl chloride; polyvinyl acetate and tetrafluoroethylene; polyvinyl acetate and polyvinyl chloride; polyvinyl acetate and polystyrene; and polyvinyl acetate and polymethyl methacrylate.

With further reference to the polymer coating mixture, by close proximity as used herein it is meant that the choice of the polymers selected are dictated by their position in the triboelectric series, therefore for example, one may select a first polymer with a significantly lower triboelectric charging value than the second polymer. For example, the triboelectric charge of a steel carrier core with a polyvinylidenefluoride coating is about −75 microcoulombs per gram. However, the same carrier, with the exception that there is selected a coating of polyethylene, has a triboelectric charging value of about −17 microcoulombs per gram. More specifically, not in close proximity refers to first and second polymers that are at different electronic work function values, that is they are not at the same electronic work function value; and further, the first and second polymers are comprised of different components. Additionally, the difference in electronic work functions between the first and second polymer is at least 0.2 electron volt, and preferably is about 2 electron volts; and moreover, it is known that the triboelectric series corresponds to the known electronic work function series for polymers, reference *"Electrical Properties of Polymers"*, Seanor, D. A., Chapter 17, *Polymer Science*, A. D. Jenkins, Editor, North Holland Publishing (1972), the disclosure of which is totally incorporated herein by reference.

The percentage of each polymer present in the carrier coating mixture can vary depending on the specific components selected, the coating weight and the properties desired. Generally, the coated polymer mixtures used contains from about 10 to about 90 percent of the first polymer, and from about 90 to about 10 percent by weight of the second polymer. Preferably, there are selected mixtures of polymers with from about 40 to 60 percent by weight of the first polymer, and from about 60 to 40 percent by weight of a second polymer. In one embodiment of the present invention, when a high triboelectric charging value is desired, that is, exceeding −50 microcoulombs per gram, there is selected from about 90 percent by weight of the first polymer such as polyvinylidenefluoride; and 10 percent by weight of the second polymer such as polyethylene. In contrast, when a lower triboelectric charging value is required, less than about −20 microcoulombs per gram, there is selected from about 10 percent by weight of the first polymer; and 90 percent by weight of the second polymer. In other embodiments of the present invention, a single polymer resin can be selected for coating the core if desired.

In accordance with a preferred embodiment of the present invention, there are provided carrier particles of relatively constant conductivities from between about $10^{-15}$ mho-cm$^{-1}$ to from about $10^{-9}$ mho-cm$^{-1}$ at, for example, a 10 volt impact across a 0. 1 inch gap containing carrier beads held in place by a magnet; and wherein the carrier particles are of a triboelectric charging value of from −15 microcoulombs per gram to −70 microcoulombs per gram, these parameters being dependent on the coatings selected, and the percentage of each of the polymers used as indicated hereinbefore.

Various effective suitable means can be used to apply the polymer mixture coatings to the surface of the carrier particles. Examples of typical means for this purpose include combining the carrier core material, and the mixture of polymers by cascade roll mixing, or tumbling, milling, shaking, electrostatic powder cloud spraying, fluidized bed, electrostatic disc processing, and an electrostatic curtain. Following application of the polymer mixture, heating is initiated to permit flowout of the coating material over the surface of the carrier core. The concentration of the coating material powder particles, as well as the parameters of the heating step, may be selected to enable the formation of a continuous film of the coating material on the surface of the carrier core, or permit only selected areas of the carrier core to be coated. When selected areas of the metal carrier core remain uncoated or exposed, the carrier particles will possess electrically conductive properties when the core material comprises a metal. The aforementioned conductivities can include various suitable values. Generally, however, this conductivity is from about $10^{-9}$ to about $10^{-17}$ mho-cm$^{-1}$ as measured, for example, across a 0.1 inch magnetic brush at an applied potential of 10 volts; and wherein the coating coverage encompasses from about 0.1 percent to about 100 percent of the carrier core.

The fibrous carbon particulate material can be prepared by various different routes including, but not limited to, those methods disclosed in, for example: the aforementioned U.S. Patents, particularly U.S. Pat. Nos. 5,149,584, 4,704,231, 4,915,925, 4,816,289, 4,435,375, and 4,420,534*; Nature*, 363, 603 and 605 (1993) and references therein, for single or multi-layer hollow carbon nanotubes with diameters of less than about 1 nanometer to 30 nanometers prepared by, for example, carbon-arc synthesis or covaporization of carbon-metal-inert gas mixtures; and U.S. Pat. No. 5,271,890 wherein irradiating a fine carbon powder on a substrate with a laser beam causes sublimation of the powder, and subsequent quenching of the sublimated fine carbon powder causes deposition of the carbon powder on the substrate. Also of interest with respect to preparative procedures and physical characterization of carbon additives is *Carbon Black: Science and Technology.*, 2nd Ed., Donnet et al. editors, Marcel Dekker, NY, N.Y., 1993.

In a preferred embodiment, the carbon fiber additive is comprised of a plurality of rolled-up graphite sheets, for example, from 1 to about 20 sheets, with an outer diameter of about 0.001 to about 0.1 microns, a hollow inner diameter of about 0.001 to about 0.01 microns, and a fiber length of about 0.1 to about 10 microns. These carbon fibers preferably have a length to diameter ratio of greater than or equal to about 5. The individual sheets are comprised of single atom thickness layers of carbon derived from catalytic dehydrogenation of hydrocarbon gases, such as ethylene. Rolled graphite sheet materials satisfying the above criteria are commercially as GRAPHITE FIBRILS from Hyperion Catalysis International, Cambridge, Mass., having, for example, nominally eight graphite layers, an outer diameter of about 0.01 microns, a hollow inner diameter of 0.005 microns, and a fiber length of about 1 to about 10 microns, reference for example, U.S. Pat. Nos. 5,445,327, 5,171,560, 5,165,909, and references therein. These materials exhibit high surface and volume conductivity properties at the aforementioned relatively low weight percentage loadings relative to the polymer resin coating.

Although not wanting to be limited by theory, the orientation of the fibrous carbon additives relative to the surface of the coated carrier core particle are not believed to be critical or limiting so long as inter-core particle contact, that is, contact between different coated core particles, via the fibrous carbon particle is possible to at least some extent. Preferred fiber orientations are expected to be those which approach or are approximately perpendicular to the surface of the coated core particle and wherein a portion of the fibrous carbon particle which is not contained in the resin coating phase substantially extends away from the surface of the the coated core surface. Carbon fibers additives which form loop structures, for example, wherein one or both ends of a single fiber particle are embedded in the resin coating layer and wherein the body of the fiber extends away from the coated surface are also expected to be effective in accomplishing the objectives of the present invention.

Illustrative examples of finely divided toner resins selected for the developer compositions of the present invention include polyamides, epoxies, polyurethanes, diolefins, vinyl resins and polymeric esterification products of a dicarboxylic acid and a diol comprising a diphenol. Specific vinyl monomers that can be used are styrene, p-chlorostyrene vinyl naphthalene, unsaturated monoolefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butyl acrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, vinyl ethers, inclusive of vinyl methyl ether, vinyl isobutyl ether, and vinyl ethyl ether, vinyl ketones inclusive of vinyl methyl ketone, vinyl hexyl ketone and methyl isopropenyl ketone; vinylidene halides such as vinylidene chloride, and vinylidene chlorofluoride; N-vinyl indole, N-vinyl pyrrolidine; styrene butadiene copolymers; mixtures thereof; and other similar substances.

As one preferred toner resin there can be selected the esterification products of a dicarboxylic acid and a diol comprising a diphenol, reference U.S. Pat. No. 3,590,000 the disclosure of which is totally incorporated herein by reference. Other preferred toner resins include styrene/methacrylate copolymers; styrene/butadiene copolymers; polyester resins obtained from the reaction of bisphenol A and propylene oxide; and branched polyester resins resulting from the reaction of dimethyl terephthalate, 1,3-butanediol, 1,2-propanediol and pentaerythritol.

Generally, from about 1 part to about 5 parts by weight of toner particles are mixed with from about 10 to about 300 parts by weight of the carrier particles prepared in accordance with the process of the present invention.

Numerous well known suitable pigments or dyes can be selected as the colorant for the toner particles including, for example, carbon black, nigrosine dye, lamp black, iron oxides, magnetites, and mixtures thereof. The pigment, which is preferably carbon black, should be present in a sufficient amount to render the toner composition highly colored. Thus, the pigment particles are present in amounts of from about 3 percent by weight to about 20 percent by weight, based on the total weight of the toner composition, however, lesser or greater amounts of pigment particles can be selected providing the objectives of the present invention are achieved.

When the pigment particles are comprised of magnetites, which are a mixture of iron oxides ($FeO.Fe_2O_3$) including those commercially available as Mapico Black, they are present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment, or colorant such as carbon black is contained therein, about 90 percent by weight of resin material is selected. Generally, however, providing the objectives of the present invention are achieved, the toner composition is comprised of from about 85 percent to about 97 percent by weight of toner resin particles, and from about 3 percent by weight to about 15 percent by weight of pigment particles such as carbon black.

Also encompassed within the scope of the present invention are colored toner compositions comprised of toner resin particles, carrier particles and as pigments or colorants, magenta, cyan and/or yellow particles, as well as mixtures thereof. More specifically, illustrative examples of magenta materials that may be selected as pigments include 1,9-dimethyl-substituted quinacridone and anthraquinone dye identified in the color index as CI 60720, CI Dispersed Red 15, a diazo dye identified in the color index as CI 26050, CI Solvent Red 19, and the like. Examples of cyan materials that may be used as pigments include copper tetra-4(octadecyl sulfonamido) phthalocyanine, X-copper phthalocyanine pigment listed in the color index as CI 74160, CI Pigment Blue, and Anthrathrene Blue, identified in the color index as CI 69810, Special Blue X-2137, and the like; while illustrative examples of yellow pigments that may be selected are diarylide yellow 3,3-dichlorobenzidene acetoacetanilides, a monoazo pigment identified in the color index as CI 12700, CI Solvent Yellow 16, a nitrophenyl amine sulfonamide identified in the color index as Foron Yellow SE/GLN, CI Dispersed Yellow 33, 2,5-dimethoxy-4-sulfonanilide phenylazo-4'-chloro-2,5-dimethoxy aceto-acetanilide, permanent yellow FGL, and the like. These pigments are generally present in the toner composition an amount of from about 1 weight percent to about 15 weight percent based on the weight of the toner resin particles.

For further enhancing the positive charging characteristics of the developer compositions described herein, and as optional components there can be incorporated herein charge enhancing additives inclusive of alkyl pyridinium halides, reference, respectively, U.S. Pat. Nos. 4,298,672; organic sulfate or sulfonate compositions, U.S. Pat. No. 4,338,390; distearyl dimethyl ammonium sulfate U.S. Pat. No. 4,291,112; and 4,904,762, entitled Toner Compositions with Charge Enhancing Additives, the disclosures of which are totally incorporated herein by reference; and other similar known charge enhancing additives. These additives are usually incorporated into the toner in an amount of from about 0.1 percent by weight to about 20 percent by weight.

The toner composition of the present invention can be prepared by a number of known methods including melt blending the toner resin particles, and pigment particles or colorants of the present invention followed by mechanical attrition. Other methods include those well known in the art such as spray drying, melt dispersion, dispersion polymerization and suspension polymerization. In one dispersion polymerization method, a solvent dispersion of the resin particles and the pigment particles are spray dried under controlled conditions to result in the desired product.

Also, the toner and developer compositions of the present invention may be selected for use in electrostatographic imaging processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines and vanadyl phthalocyanines. As charge transport molecules there can be selected the aryl diamines disclosed in the '990 patent. Also, there can be selected as photogenerating pigments, squaraine compounds, thiapyrillium materials, and the like. These layered members are conventionally charged negatively thus requiring a positively charged toner. Other photoresponsive devices useful in the present invention include polyvinylcarbazole 4-dimethylaminobenzylidene, benzhydrazide; 2-benzylidene-amino-carbazole, 4-dimethamino-benzylidene, (2-nitro-benzylidene)-p-bromoaniline; 2,4-diphenyl-quinazoline; 1,2,4-triazine; 1,5-diphenyl-3-methyl pyrazoline 2-(4'-dimethylaminophenyl)-benzoxazole; 3-aminocarbazole, polyvinyl carbazole-trinitrofluorenone charge transfer complex; and mixtures thereof. Moreover, the developer compositions of the present invention are particularly useful in electrostatographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference.

Images obtained with this developer composition had acceptable solids, excellent halftones and desirable line resolution, with acceptable or substantially no background deposits.

With further reference to the process for generating the carrier particles illustrated herein, there is initially obtained, usually from commercial sources, the uncoated carrier core and the polymer powder mixture coating. The individual components for the coating are available, for example, from Pennwalt, as 301F Kynar, Allied Chemical, as Polymist B6, and other sources. Generally, these polymers are blended in various proportions as mentioned hereinbefore as, for example, in a ratio of 0.1 to 0.9; 0.4 to 0.6; 0.5 to 0.5; and various intermediate amounts. The blending can be accomplished by numerous known methods including, for example, a V-cone mixing apparatus. Thereafter, the carrier core polymer blend is incorporated into a mixing apparatus, about 1 percent by weight of the powder to the core by weight in a preferred embodiment and mixing is affected for a sufficient period of time until the polymer blend is uniformly distributed over the carrier core, and mechanically or electrostatically attached thereto. Subsequently, the resulting coated carrier particles are metered into a rotating tube furnace, which is maintained at a sufficient temperature to cause melting and fusing of the polymer blend to the carrier core.

In an illustrative embodiment, there is provided a process for preparing a coated carrier composition comprising: coating carrier core particles with a solution of at least one polymer resin, fibrillated carbon fibers, an optional plasticizer compound, and a solvent or solvent mixture; and evaporating the solvent, and wherein the resulting outer surface of the coated carrier is fibrillated.

In other embodiments, there is provided a process for preparing a coated carrier composition comprising: coating carrier core particles with a mixture of at least one polymer resin, a fibrillated or non-fribrillated carbon fiber particulate additive, and optionally a plasticizer compound, and wherein the resulting outer surface of the coated carrier is fibrillated.

The carrier compositions of the present invention are, in embodiments, useful in, for example, fine particle sized color toners and marking processes comprising, for example, toner particle sizes on the order of from about 2 to about 8 microns.

The preparative coating processes of the present invention, in embodiments, can be accomplished in accordance with the aforementioned commonly owned and assigned U.S. Pat. No. 4,937,166.

In embodiments of the present invention, the compositions may be prepared by conventional mechanical, chemical and physical means known to one of ordinary skill in the art and upon comprehending the present invention.

Other materials that may be used in conjunction with the fibrillated coatings and preparative processes thereof are metallic fibers, flakes, whiskers, and the like, wherein the materials may be either magnetic or non-magnetic.

The fibrillated carrier coatings enable developers with greater toner concentration and latitude by increasing tribo charging surface area while reducing toner dust and dirt generation.

The carrier coatings may be applied to any core material such as steel, nickel, ferrite, glass, ceramic and the like materials, to produce useful tribo charging properties when combined with suitable black and colored toners. The carrier coatings produced may also be combined with other suitable powdered resins to yield positive or negative charging marking materials as desired. Solvents may also be employed to adhere the coating materials and/or the fibrous carbon particulate material to the core particles.

The developers obtained from combining the carrier with suitable toners may be used in, for example, xerographic, ionographic or other imaging process for single pass color, multiple pass color, at one or more potential level, for example, the known tri-level xerographic processes, for light lens or digital copiers and printing machines.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A carrier comprised of a core with a coating thereover comprised of at least one polymer resin and at least one fibrous carbon additive, wherein the outer surface of the coated carrier is fibrillated, and wherein the fibrillated outer surface of the coated carrier has a fiber surface area of about 10 fibers per 100 square microns to about 90,000 fibers per 100 square microns.

2. A carrier according to claim 1 wherein the fibrillated outer surface of the coated carrier is comprised substantially of fibrillated carbon fibers with an average diameter of about 0.001 microns to about 0.5 microns, and an average length of about 0.1 micron to about 1,000 microns.

3. A carrier according to claim 2 wherein the fibrillated carbon fibers are present in an amount of from about 0.5 to about 50 weight percent based on the total weight of the polymer coating.

4. A carrier according to claim 1 wherein the polymer resin is prepared from monomers selected from the group consisting of vinylidene difluoride, hexafluoropropylene, vinyl carbazole, 4-vinyl pyridine, styrene, tetrafluoroethylene, butadiene, alkene monomers with from 2 to about 20 carbon atoms, vinyl chloride, vinyl acetate, and acrylate esters with from 4 to 24 carbon atoms, and polyester condensation products of diesters or diacids and diols, and mixtures thereof.

5. A carrier according to claim 1 further comprising a plasticizer compound in admixture with the polymer resin.

6. A carrier according to claim 1 wherein the coated carrier has a positive or negative triboelectric charging value from about 5 to about 80 microcoulombs per gram.

7. A carrier according to claim 1 wherein the conductivity thereof is from about $10^{-6}$ mho-cm$^{-1}$ to about $10^{-17}$ mho-cm$^{-1}$.

8. A carrier according to claim 1 wherein the core is selected from the group consisting of iron, ferrites, magnetite, steel, nickel, glass, ceramic composites, plastic, and mixtures thereof.

9. A carrier according to claim 1 wherein the resin coating weight is from about 0.05 to about 3 weight percent.

10. A carrier according to claim 1 wherein the polymer resin coating is comprised of an admixture of a first polymer in an amount of from about 40 to about 60 percent by weight, and a second polymer in an amount of from about 60 to about 40 percent by weight.

11. A carrier according to claim 10 wherein the conductivity characteristics of the carrier can be systematically varied by changing the relative weight of the coating to the core, and the amount of carbon fiber surface area on the coated core.

12. A carrier according to claim 1 wherein the triboelectric charge thereof is from about a −10 to about a −75 microcoulombs per gram, and wherein the carrier possesses a substantially constant conductivity.

13. A developer composition comprising the carrier of claim 1 and toner particles, and wherein the toner particle size is from about 2 to about 8 microns in volume average diameter.

14. A carrier in accordance with claim 1 wherein the fibrous carbon additive is selected from the group consisting of fibrillated and non-fibrillated carbon particles.

15. A carrier in accordance with claim 1 wherein at least one polymer includes 1 to about 5 polymers.

16. A carrier in accordance with claim 1 wherein the carrier core has an average volume diameter of about 25 to about 1,000 microns.

17. A process for preparing a coated carrier composition comprising:

coating carrier core particles with a mixture of at least one solvent soluble polymer resin, insoluble fibrillated or non-fibrillated carbon fibers, an optional plasticizer compound, and a solvent or solvent mixture; and evaporating the solvent, wherein the resulting outer surface of the resin coated carrier is fibrillated, and wherein the fibrillated outer surface of the coated carrier has a fiber surface area of about 10 fibers per 100 square microns to about 90,000 fibers per 100 square microns.

18. A process according to claim 17 wherein the polymer resin or resins are present in an amount from about 0.05 to about 3.0 weight percent, the fibrillated carbon fibers in an amount from about 0.005 to about 1.5 weight percent, and solvent in an amount of from about 10 to about 90 weight percent, based on the total weight of the coating mixture.

19. A process for preparing a coated carrier composition comprising:

coating carrier core particles with a mixture of at least one polymer resin, a fibrillated or non-fibrillated carbon fiber particulate additive, and optionally a plasticizer compound, wherein the resulting outer surface of the resin coated carrier is fibrillated, and wherein the fibrillated outer surface of the coated carrier has a fiber surface area of about 10 fibers per 100 square microns to about 90,000 fibers per 100 square microns.

20. A process in accordance with claim 19 wherein the coating mixture is a dry powder, a liquid suspension, or liquid solution.

* * * * *